United States Patent
Patterson et al.

(10) Patent No.: US 9,805,126 B2
(45) Date of Patent: *Oct. 31, 2017

(54) CONTEXT-BASED RANKING OF SEARCH RESULTS

(71) Applicant: Facebook, Inc., Menlo Park, CA (US)

(72) Inventors: Ryan Patterson, Mountain View, CA (US); Michael Dudley Johnson, San Francisco, CA (US); Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,694

(22) Filed: Oct. 29, 2014

(65) Prior Publication Data

US 2015/0058332 A1 Feb. 26, 2015

Related U.S. Application Data

(63) Continuation of application No. 13/152,614, filed on Jun. 3, 2011, now Pat. No. 8,909,637.

(51) Int. Cl.
*G06F 17/30* (2006.01)
*H04L 12/18* (2006.01)

(52) U.S. Cl.
CPC .. *G06F 17/30867* (2013.01); *G06F 17/30386* (2013.01); *G06F 17/30554* (2013.01); *H04L 12/1813* (2013.01)

(58) Field of Classification Search
None
See application file for complete search history.

(56) References Cited

U.S. PATENT DOCUMENTS

| | | | |
|---|---|---|---|
| 6,405,216 B1 | 6/2002 | Minnaert | |
| 7,680,781 B1 | 3/2010 | Wasserman | |
| 7,720,833 B1 | 5/2010 | Wen | |
| 8,095,582 B2 | 1/2012 | Cramer | |
| 8,239,370 B2 * | 8/2012 | Wong | G06F 17/30693 707/713 |
| 8,301,639 B1 * | 10/2012 | Myllymaki | G06F 17/3097 707/748 |

(Continued)

FOREIGN PATENT DOCUMENTS

| | | |
|---|---|---|
| CN | 1937518 A | 3/2007 |
| CN | 102016825 A | 4/2011 |

(Continued)

OTHER PUBLICATIONS

Examination Report for MX Application No. MX/a/2013/014211 (with English translation), dated Apr. 8, 2015.

(Continued)

*Primary Examiner* — Sangwoo Ahn
(74) *Attorney, Agent, or Firm* — Baker Botts L.L.P.

(57) ABSTRACT

In one embodiment, a computing device may access a search query provided by a user; identify a set of search results in response to the search query, wherein one or more search results in the set are associated with a feature of a social-networking system; rank the set of search results based on one or more factors; boost one or more ranks of the one or more search results associated with the feature to bring the feature to the user's attention; and present the set of search results to the user in order of its ranking.

18 Claims, 2 Drawing Sheets

(56) References Cited

U.S. PATENT DOCUMENTS

| | | | |
|---|---|---|---|
| 8,700,540 B1* | 4/2014 | Zambrano | G06Q 50/01 705/319 |
| 8,909,637 B2 | 12/2014 | Patterson | |
| 2003/0163455 A1 | 8/2003 | Dettinger | |
| 2003/0169284 A1 | 9/2003 | Dettinger | |
| 2004/0119760 A1 | 6/2004 | Grossman | |
| 2005/0144158 A1 | 6/2005 | Capper | |
| 2006/0004892 A1 | 1/2006 | Lunt | |
| 2006/0123014 A1 | 6/2006 | Ng | |
| 2006/0235873 A1 | 10/2006 | Thomas | |
| 2006/0259861 A1 | 11/2006 | Watson | |
| 2006/0287985 A1 | 12/2006 | Castro | |
| 2008/0005072 A1 | 1/2008 | Meek | |
| 2008/0072180 A1 | 3/2008 | Chevalier | |
| 2008/0183695 A1* | 7/2008 | Jadhav | G06F 17/30601 |
| 2008/0235111 A1 | 9/2008 | Dotan | |
| 2008/0248815 A1 | 10/2008 | Busch | |
| 2009/0164929 A1 | 6/2009 | Chen | |
| 2009/0271374 A1 | 10/2009 | Korn | |
| 2009/0281988 A1 | 11/2009 | Yoo | |
| 2009/0287645 A1 | 11/2009 | Dasdan | |
| 2009/0307205 A1 | 12/2009 | Churchill | |
| 2009/0327520 A1* | 12/2009 | Lee | G06F 17/30867 709/240 |
| 2010/0082593 A1 | 4/2010 | Singh | |
| 2010/0106703 A1 | 4/2010 | Cramer | |
| 2010/0223257 A1 | 9/2010 | Milic-Frayling | |
| 2010/0306191 A1 | 12/2010 | LeBeau | |
| 2011/0022602 A1* | 1/2011 | Luo | G06Q 10/10 707/748 |
| 2011/0055189 A1 | 3/2011 | Effrat | |
| 2011/0131241 A1 | 6/2011 | Petrou | |
| 2011/0173569 A1* | 7/2011 | Howes | G06F 17/30902 715/835 |
| 2011/0201320 A1 | 8/2011 | Wosk | |
| 2011/0246487 A1* | 10/2011 | Malec | G06F 17/3064 707/751 |
| 2011/0264648 A1 | 10/2011 | Gulik | |
| 2011/0264681 A1 | 10/2011 | Kimberlin | |
| 2011/0276396 A1 | 11/2011 | Rathod | |
| 2011/0312423 A1 | 12/2011 | Mosites | |
| 2011/0320423 A1* | 12/2011 | Gemmell | G06F 17/30867 707/706 |
| 2011/0320441 A1 | 12/2011 | Lee | |
| 2012/0036454 A1 | 2/2012 | Cole | |
| 2012/0110032 A1 | 5/2012 | Robison | |
| 2012/0158715 A1* | 6/2012 | Maghoul | G06F 17/30867 707/728 |
| 2012/0185472 A1 | 7/2012 | Ahmed | |
| 2012/0239646 A1* | 9/2012 | Bailey | G06F 17/30675 707/733 |
| 2012/0304079 A1 | 11/2012 | Rideout | |
| 2015/0169571 A1 | 6/2015 | Farago | |

FOREIGN PATENT DOCUMENTS

| | | |
|---|---|---|
| JP | 2008-527568 A | 7/2008 |
| JP | 2008-243008 (A) | 10/2008 |
| JP | 2009-508266 | 2/2009 |
| JP | 2009-509275 (A) | 3/2009 |
| JP | 2009-140170 A | 6/2009 |
| JP | 2009-237750 | 10/2009 |
| JP | 2010-086150 (A) | 4/2010 |
| JP | 2010-128849 (A) | 6/2010 |
| KR | 10-2011-0032878 | 3/2011 |
| WO | WO 01/35714 A2 | 5/2001 |
| WO | WO 02/091162 A3 | 11/2002 |
| WO | WO 2005/089291 A2 | 9/2005 |
| WO | WO 2006/104952 A1 | 10/2006 |
| WO | WO 2010/048219 A2 | 4/2010 |

OTHER PUBLICATIONS

Korean Intellectual Property Office Notice of Preliminary Rejection for Application No. 10-2013-7033941 (with translation), dated May 21, 2015.
Japanese Patent Office Notification of Reasons for Rejection of Application 2014/513686 (with translation), dated May 26, 2015.
Office Action of the Canadian Intellectual Property Office for Application No. 2,837,507, dated Apr. 8, 2015.
Patterson et al., "Context-Based Ranking of Search Results", Jun. 3, 2011.
Johnson et al., "Context-Based Selection of Calls-To-Action Associated with Search Results", Jun. 3, 2011.
Johnson et al., "Suggesting Search Results to Users Before Receiving Any Search Query from the Users", Jul. 26, 2011.
Int'l Search Report and Written Opinion for International Application No. PCT/US2012/045888, dated Dec. 18, 2012.
PCT Notification of Transmittal of the International Search Report and the Written Opinion of the International Searching Authority, or the Declaration PCT/US2012/040160, dated Jan. 31, 2013.
European Patent Office Search Report for Application 12792344.9-1952, dated Jan. 21, 2015.
U.S. Appl. No. 13/152,614, filed Jun. 3, 2011, Patterson.
U.S. Appl. No. 13/152,664, filed Jun. 3, 2011, Johnson.
U.S. Appl. No. 13/191,307, filed Jul. 26, 2011, Johnson.
U.S. Appl. No. 14/715,364, filed May 18, 2015, Johnson.
U.S. Appl. No. 14/949,598, filed Nov. 23, 2015, Johnson.
Notification of Reason for Rejection for JP 2015-156795, dated Nov. 1, 2016.
Tokix, et al., "Feature Article 1: Get out from rudimentary Q&A," Netrun, published by New-Akiba Co., Ltd., Japan, vol. 3, No. 1, p. 58-63. *no English translation available, Jan. 1, 2009.
Daisuke Okanohara, "Intensive Workshop—Search Engine, Rapidly evolving search tech," Web+DB Press, published by Gijutsu-Hyohron Co., Ltd., Japan, vol. 53, p. 94-104. *no English translation available, Nov. 25, 2009.
Australian Government Patent Examination Report No. 1 for Australian Patent Application No. 2015203144, dated Aug. 10, 2016.
Notification of the First Office Action for Chinese Application/Patent No. 2012800317557 with English translation and comments and Search Report, dated May 24, 2016.
European Patent Office Communication for Application 12792344.9-1952, dated Jul. 12, 2016.
Examination Report No. 2 for Australian Patent Application No. 2015203144, dated Jan. 3, 2017.
European Patent Office's Result of Consultation of Jan. 24, 2017 for Application No. 12 792 344.9-1952, dated Jan. 25, 2017.
Canadian Intellectual Property Office Notification of a Requisition by the Examiner for Application No. 2,897,120, dated Nov. 18, 2016.
Australia Government Patent Examination Report No. 1 for Application No. 2016200666 (with translation), dated May 30, 2017.
Japanese Patent Office Notification of Reason for Rejection of Application No. 2016-013985 (with translation and Abstract), dated May 30, 2017.
European Patent Office Minutes of Oral Proceedings before the Examining Division for Application No. 12 792 344.9, dated May 12, 2017.
European Patent Office Decision to refuse a European Patent Application for Application 12 792 344.9, dated May 12, 2017.
Australian Government Patent Examination Report No. 3 for Australian Patent Application No. 2015203144, dated Apr. 5, 2017.
Notification of Reason for Rejection of JP Application No. 2016-013985, dated Dec. 6, 2016.
Examination Report No. 2 for AU Patent Application 2016200666, dated Aug. 15, 2017.

\* cited by examiner

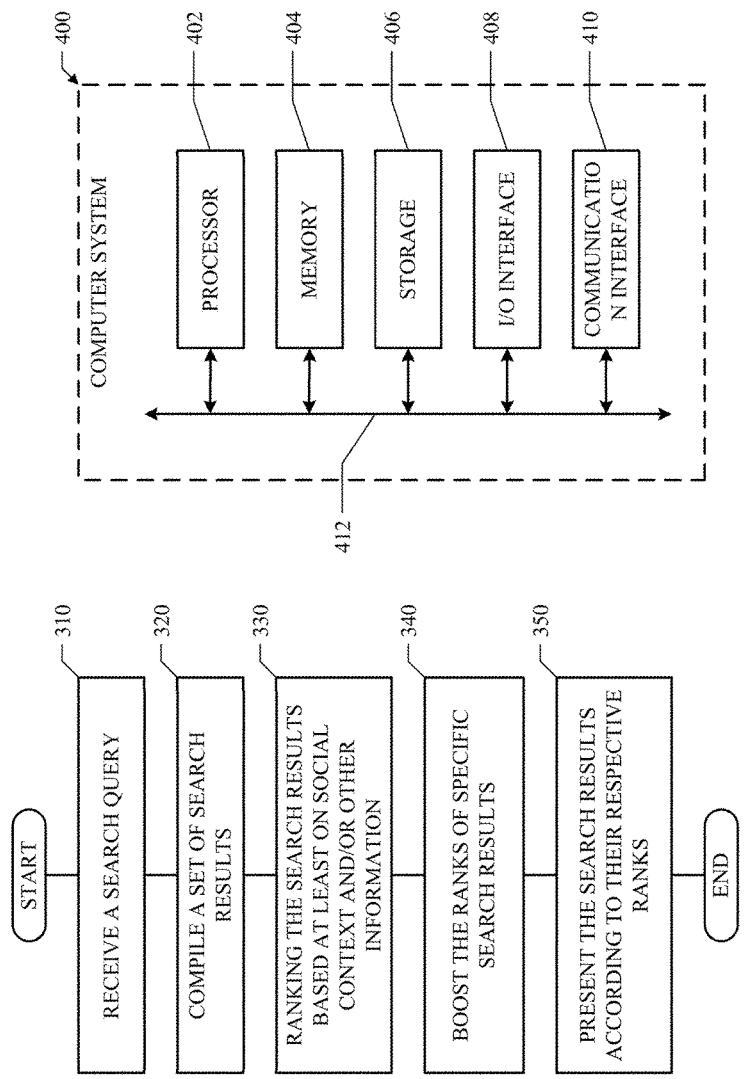

CONTEXT-BASED RANKING OF SEARCH RESULTS

PRIORITY

This application is a continuation under 35 U.S.C. §120 of U.S. patent application Ser. No. 13/152,614, filed 3 Jun. 2011.

TECHNICAL FIELD

This disclosure generally relates to improving the quality of search results identified for search queries.

BACKGROUND

The Internet provides a vast amount of information, which may be stored at many different sites and on many different devices, such as on servers and clients or in databases, around the world. These different devices at the different sites are communicatively linked to computer or communication networks over wire-line or wireless connections. A person may access specific pieces of information available on the Internet using a suitable network device (e.g., a computer, a smart mobile telephone, etc.) connected to a network.

Due to the sheer amount of information available on the Internet, it is impractical as well as impossible for a person (e.g., a network user) to manually search throughout the Internet for the specific pieces of information he needs. Instead, most network users rely on different types of computer-implemented tools to help them locate the desired information. One of the most commonly and widely used computer-implemented tools is a search tool, also referred to as a search engine. To search for information relating to a specific topic on the Internet, a user typically provides a few words, often referred to as a "search query" or simply "query", describing the topic to a search tool. The search tool conducts a search based on the search query using various search algorithms and generates a set of search results, each corresponding to some information that is most likely to be related to the search query. The search results are then presented to the user.

Sophisticated search tools implement many other functionalities in addition to merely identifying the search results as a part of the search process. For example, a search tool usually ranks the identified search results according to their relative degrees of relevance with respect to the search query, such that the search results that are relatively more relevant to the search query are ranked higher than and consequently are presented to the network user before the search results that are relatively less relevant to the search query. There are continuous efforts to improve the quality of the search results generated by the search tools.

SUMMARY OF PARTICULAR EMBODIMENTS

This disclosure generally relates to improving the quality of search results identified for search queries.

In particular embodiments, one or more computing devices may access a search query provided by a user; identify a set of search results in response to the search query, wherein one or more search results in the set are associated with a feature of a social-networking system; rank the set of search results based on one or more factors; boost one or more ranks of the one or more search results associated with the feature to bring the feature to the user's attention; and present the set of search results to the user in order of its ranking.

These and other features, aspects, and advantages of the disclosure are described in more detail below in the detailed description and in conjunction with the following figures.

BRIEF DESCRIPTION OF THE DRAWINGS

FIG. 3 illustrates an example method of ranking a set of search results identified in response to a search query.

FIG. 4 illustrates an example computer system.

DESCRIPTION OF EXAMPLE EMBODIMENTS

Figure 2:
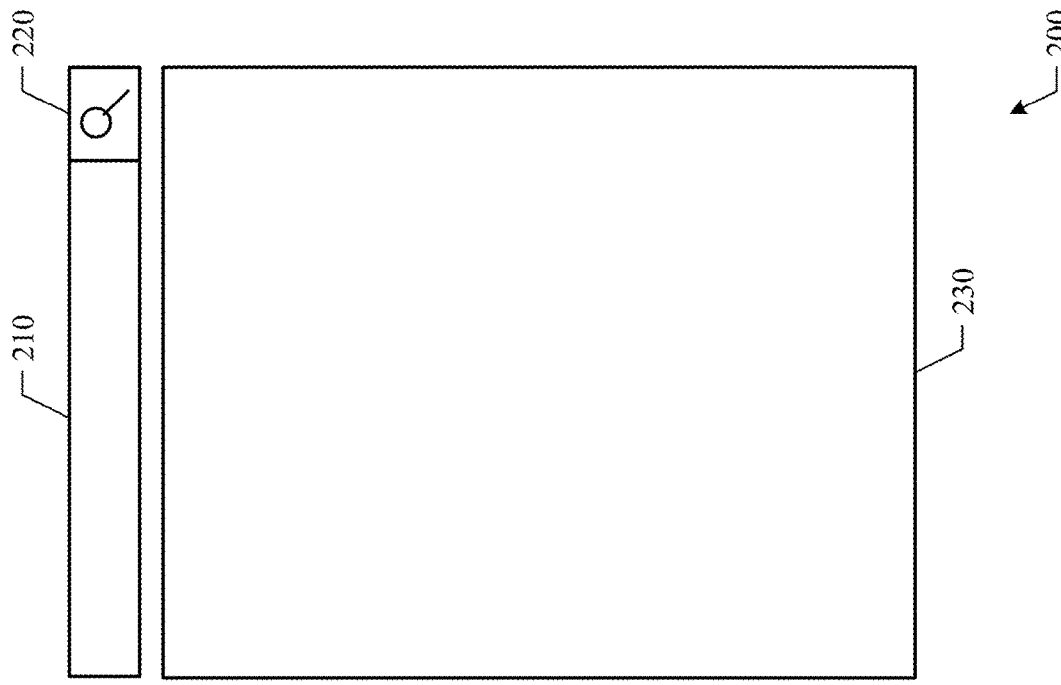
FIG. 2 illustrates an example user interface through which a user may search for information.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A computer-implemented search tool is designed to search for information relevant to specific topics on one or more networks, such as the Internet or an Intranet. To conduct a search, a network user may issue a search query to the search tool. The search query generally contains one or more words that describe a topic. In response, the search tool may identify a set of search results, each corresponding to some information that is likely to be related to the search query. The set of search results may be ranked based on any number of factors and presented to the user according to their respective ranks.

When ranking a set of search results with respect to a search query, many different factors may be considered. For example, the content of each search result may be analyzed to determine its degree of relevance to the search query. In addition, particular embodiments may rank the search results based on factors such as, for example and without limitation, the context in which the search is being conducted, the nature or characteristics of the topic described by the search query, the time when and the location where the search is requested, and the social-networking information and the behavior profile of the user requesting the search. Particular embodiments may also boost the ranks of certain search results according to objectives such as, for example and without limitation, the business strategies or goals of the entity providing the search tool.

In particular embodiments, the search tool may be provided by or associated with a social-networking system. The social-networking system may have any number of features, such as, for example and without limitation, enabling its users to contact their friends via emails or messages, organize events, form social groups, upload and share photos, read news feeds, use various web-based applications (e.g., provided either by the social-networking system or third parties), play online games, and so on. In particular embodiments, one or more search results in the set may be associated with such a feature. When ranking the set of search results, the level of interaction the user has with the feature may be taken into consideration. In some cases, the respective ranks of the search results associated with the feature may be boosted (i.e., artificially increased) in order to bring the feature to the user's attention in the hopes that the level of interaction the user has with the feature may be increased.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, organize events, etc.

A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a graph that may have any number of nodes and edges, an example of which is illustrated in FIG. 1.

Figure 1:
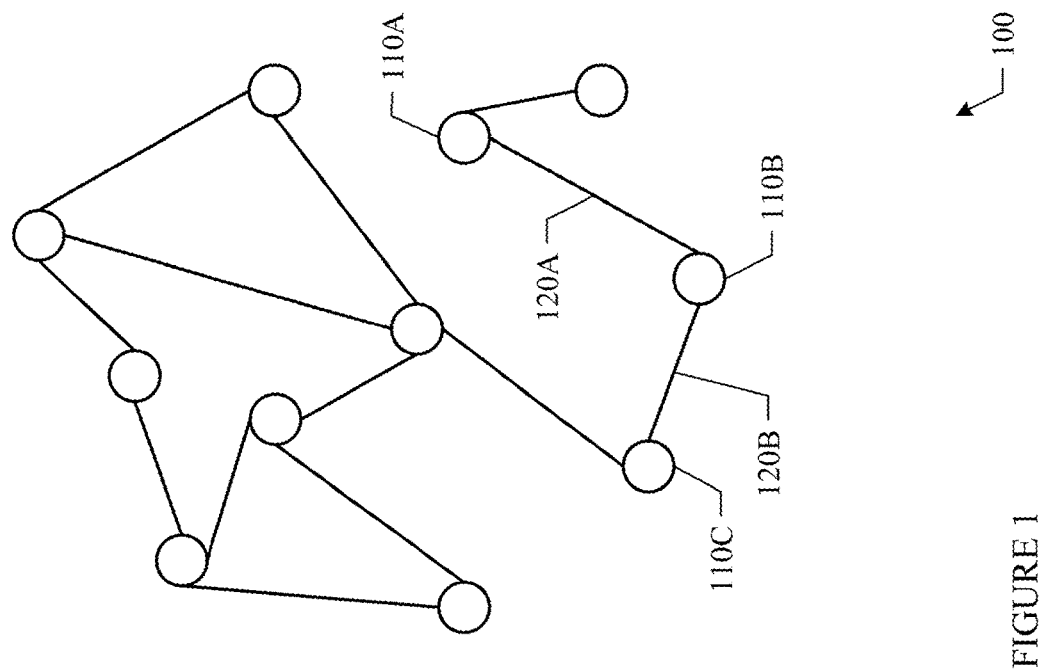
FIG. 1 illustrates an example graph that represents the information contained in a social-networking system.

In graph 100 illustrated in FIG. 1, each node may represent an entity, which may be human (e.g., user of the social-networking system) or non-human (e.g., location, event, action, business, object, message, post, image, web page, news feed, etc.). Two nodes are connected with an edge if the two nodes are related in some way (i.e., there is a relationship between the two nodes). Example cases when two nodes in graph 100 may be related and thus connected with an edge may include, without limitation, (1) the two nodes represent two users of a social-networking system respectively, and the two users are socially connected (e.g., friends of each other); (2) the two nodes represent a user of the social-networking system and an event respectively, and the user has attended the event; (3) the two nodes represent a user of the social-networking system and a location, and the user has been to the location; (4) the two nodes represent a user of the social-networking system and the user has interacted with (e.g., viewed) the web page; (5) the two nodes represent an event and a location respectively, and the event is held at the location; (6) the two nodes represent a user of the social-networking system and an image (e.g., a digital photograph) respectively, and the user is in the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities. Any type of relationship between two human or non-human entities may result in a connection between the two entities.

In graph 100, when there is an edge between two specific nodes, the two nodes may be considered directly related. For example, edge 120A connects nodes 110A and 110B, and thus nodes 110A and 110B are directly related. Similarly, edge 120B connects nodes 110B and 110C, and thus nodes 110B and 110C are directly related. When there is no edge between two particular nodes, the two nodes may still be considered indirectly related. For example, there is no edge directly connecting nodes 110A and 110C; however, nodes 110A and 110C may still be considered indirectly related through node 110B.

With respect to node 110A, node 110B has a closer relationship to it than node 110C, because in graph 100, it takes one hop to go from node 110A to node 110B, but it takes two hops to go from node 110A to node 110C (i.e., through node 110B). In particular embodiments, with respect to two specific nodes, the less number of hops it takes to go from one node to another node, the closer the two nodes are related.

In particular embodiments, a social-networking website implementing a social-networking system may provide a search tool that enables its users to search for information relating to specific topics in the social context. The information represented by a graph, such as the one illustrated in FIG. 1, may be used to help identify and rank the search results. FIG. 2 illustrates an example user interface 200 through which a user may provide search queries and receive search results. In this case, there is an input field 210 through which a user may provide search queries, an icon 220 through which the user may submit the search queries (e.g., by clicking on icon 220), and an output field 230 where the search results may be displayed.

In particular embodiments, a user interface, such as the one illustrated in FIG. 2, may be incorporated in a web page or a window panel for display on the screen of an electronic device. For example, interface 200 may be displayed on the screen of a mobile telephone or tablet.

In particular embodiments, the search tool may implement the "type ahead" feature, also known as "incremental search", "incremental find", or "real-time suggestions", which is a user interface interaction method to progressively search for and filter through texts (e.g., search queries). As a user types the text of a search query, one or more possible matches for the text are found and immediately presented to the user. This immediate feedback often allows the user to stop short of typing the entire word or phrase of the search query. The user may also choose a closely related option from the presented list. In addition, in particular embodiments, as the user types each character of a search query, a set of search results corresponding to the text thus far typed may be presented to the user immediately. The search results may be updated each time the user further types a character.

For example, suppose that a user wants to search for a person, and begins to input the person's name as the search query. The user first types the character "j" (e.g., in an input field included in a user interface). At this point, some of the names that begin with the letter "j" (e.g., Jane, John, Joseph, Judith, etc.) may be suggested to the user. In addition, a set of search results corresponding to one or more of the suggested names (e.g., the first suggested name, Jane, or several of the suggested names, Jane, John, Joseph, etc.) may be presented to the user as well. Suppose that the user next types in the character "o". At this point, some of the names that begin with the letters "jo" (e.g., Joan, John, Jordon, Joseph, Joshua, etc.) may be suggested to the user. In addition, a set of search results corresponding to one or more of the suggested names (e.g., Joan, or Joan, John, etc.) may be presented to the user as well. This process may continue until the user finishes typing the name or selects one of the suggested names or search results. Type ahead is described in more detail in U.S. patent application Ser. No. 12/816,377, entitled "Search and Retrieval of Objects in a Social Networking System", filed on 15 Jun. 2010, which is hereby incorporated by reference in its entirety and for all purposes.

When typing search terms, the user can occasionally enter wrong characters as part of the search phrase. Using past knowledge of the particular user's search queries, general user search queries, the layout of the current keyboard on the device, and a definition of the language or languages the user is likely to be typing in, allows the search provider to "guess" the likely search phrase even when an incorrect character has been entered. For example, the character "o" on a standard US QWERTY keyboard is most closely surrounded by the characters "o", "p", ";", ",", and "k". If a user types "j", then the set of results for all 2-letter combinations other than "jo" are unlikely to be the user's intended search query. If results exist for "jl", they can be displayed. If no such results exist, then the results for "jo" can be displayed to the user, with an indicator that an auto-correction has temporarily been applied. This reduces the need for the user to correct the search query before tapping on the search result.

Note that in the example user interface 200 illustrated in FIG. 2, an icon 220 is illustrated for submitting the search queries. This icon is not necessary in all cases. For example, when the "type ahead" feature is supported, icon 220 may not be needed and included in a search-related user interface.

When a search tool receives a search query from a user, it may identify a set of search results considered relevant to the search query. In addition, the set of search results may be ranked based on various factors, objectives, and other considerations. The search results that are ranked higher are presented to the user before the search results that are ranked lower. Achieving a good ranking of the search results for a user is especially desirable in some cases. For example, often, a user may conduct searches using a mobile electronic device (e.g., a mobile telephone or a tablet computer) that has a relatively small display screen. Consequently, not many search results may be displayed and presented to the user within one screen. To avoid having to make the user scroll down multiple screens to locate the specific search results he is looking for, if these search results are ranked higher and presented to the user first, it can save the user time and make the search experience more efficient and pleasant for the user.

In particular embodiments, the user may be a user of the social-networking system providing or associated with the search tool. When compiling and ranking the set of search results in response to a search query, the search tool may examine and analyze any relevant information available to the social-networking system and thus to the search tool (i.e., not just limited to web pages or other types of contents available on the Internet). For example and without limitation, the search tool may consider: (1) the nature and the context (especially the social context) of the search query (e.g., whether the search query refers to a person, a location, an event, a place, a software or web application, an object, etc.); (2) the social and demographical information of the user requesting the search (e.g., the user's social connections, age, gender, family status, etc.); (3) the behavior profile or activities of the user (e.g., the user's daily routines, hobbies, interests, past network or social activities, etc.); (4) the time when and the location where the user provides the search query; (5) whether the social-networking system desires to promote certain search results (e.g., search results associated with a feature of the social-networking system, which the social-networking system desires to bring to the user's attention); (6) whether the social-networking systems desires to train or guide the user toward certain search results or behaviors; (7) the historical behavior of the user in using this or other search tools previously, such as whether the user typically selects or fails to select certain classes of or certain particular results; (8) the historical behavior of the user in certain locations (e.g., the user always selects results referring to people while at home, but selects results referring to businesses while not at home); and (9) the historical behavior of the user with respect to whether the user responds to the search results after selecting one (e.g., by commenting or liking on the result that is delivered). In addition, in particular embodiments, the search tool may examine and analyze information stored on the electronic device used by the user to request the search, and may include some of such information in the search results (e.g., if such information is considered relevant to the search query).

FIG. 3 illustrates an example method of ranking a set of search results identified in response to a search query while taking into consideration at least some of the social information relevant to the user requesting the search. As described above in connection with FIG. 1, the information available in a social-networking system may be represented by a graph (e.g., graph 100). Such a graph may be used when compiling and ranking a specific set of search results for a specific user. In particular embodiments, since the user requesting the search is a user of the social-networking system, one of the nodes in the graph may represent the user. By analyzing the graph, the search tool may determine what other human and non-human entities are directly or indirectly related to the user (e.g., other nodes in the graph that are connected, directly or indirectly, to the node representing the user), the types of these relationships (e.g., what relationships the edges represent), and how closely the other nodes are related to the node representing the user (e.g., the number of hops between each pair of nodes).

Particular embodiments may receive a search query from a user, as illustrated in STEP 310. The user may be a user of the social-networking system and may provide the search query through an electronic device (e.g., a mobile telephone or tablet) connected to a network. For example, suppose that the search query is the word "Johnson".

Particular embodiments may identify and compile a set of search results in response to the search query, as illustrated in STEP 320. The search results may include any type of information or content. For example, the word "Johnson" may refer to a person (e.g., Mary Johnson), a location (e.g., Johnson City), an establishment (e.g., Johnson's Hardware Store, or Johnson BBQ Restaurant), a brand or product name (e.g., Johnson & Johnson), a news story (e.g., a news feed about Jimmie Johnson), and a message (e.g., a post by or concerning Tom Johnson). The search results may be a mixture of many types of information considered relevant to the search query.

When selecting the search results, particular embodiments may obtain information from various sources, such as, for example and without limitation, information stored locally on the electronic device used by the user, information stored on servers or in databases associated with the social-networking system, and information publically available on the Internet. For example, the contact information of a person named "Mary Johnson" may be stored locally on the user's electronic device. Thus, the name and contact information (e.g., email address or phone number) of Mary Johnson may be selected as one of the search results included in the set. In this case, the search result comes from the information stored on the electronic device used by the user when conducting the search. As another example, from the user's account at the social-networking website, it may be determined that the user has visited a restaurant called "Johnson BBQ Restaurant" several times in the past (e.g., the user has "checked in" with the social-networking system when at Johnson BBQ Restaurant). Thus, the name and address of Johnson BBQ Restaurant may be selected as one of the search results included in the set. In this case, the search result comes from the information stored on servers or in databases associated with the social-networking system. As another example, there may be news stories on the Internet about Jimmie Johnson participating in a NASCAR race. Thus, a web page containing such a news story may be selected as one of the search results included in the set. In this case, the search result comes from the information publically available on the Internet.

When the user submits the search query to initiate the search process, since the search results may be obtained from various sources, some specific search results may become available before others. For example, search results obtained from information stored locally on the electronic device used by the user may be readily available, before search results obtained from information associated with the social-networking system or on the Internet, which may take a slightly longer time to obtain since they are stored at remote sites. In particular embodiments, as soon as some search results become available, they may be presented to the user immediately, instead of having to wait for other search results to become available. For example, in the above scenario, the contact information for "Mary Johnson" is stored locally on the user's electronic device and thus may be readily available. Upon the user submitting the search query "Johnson", the contact information for "Mary Johnson" may be presented to the user immediately. Then, as more search results become available (e.g., obtained from the social-networking system or the Internet, such as the address and phone number of "Johnson BBQ Restaurant"), they may be added to the set of search results compiled for the search query "Johnson" and presented to the user accordingly (e.g., upon their availability).

A social-networking system may implement and support any number of features. In particular embodiments, one or more of the search results selected in response to the search query may be associated with one or more of such features. In some cases, it may be possible that a search result not highly relevant to the search query may nevertheless be selected and included as one of the search results for the search query. For example, one feature may be that a user may play online games through the social-networking website. One of the available games called "Hatchlings" may be selected as one of the search results for search query "Johnson", even though this game has little or no apparent relevance to the word "Johnson".

Particular embodiments may rank the set of search results based at least on the social context or information relevant to the user requesting the search, as illustrated in STEP 330. Existing search engines (e.g., search engines provided by Google, Microsoft, or Yahoo) rank search results based mainly on content relevance. They do not take into consideration of social context or information relevant to the specific user requesting the search because they are not provided by any social-networking system that possesses such social information. Instead or in addition to content relevance, particular embodiments may take into consideration of the social information available to the social-networking system providing or associated with the search tool as some of the factors when ranking the search results for the user. In a sense, the ranking is customized for each individual user based on the user's social information. In addition, in particular embodiments, the user's past behavior may be used to help identify and/or rank the search results.

For example, suppose that there are three people named "Johnson" found as users of the social-networking system. Without any social information of the user requesting the search, all three Johnsons may be similarly likely to be the person the user is searching for. In one case, suppose that based on the social information of the user, one of the Johnsons (e.g., Johnson #1) may be a friend of the user while the other two are not. In this case, Johnson #1 may be ranked higher than the other two Johnsons as it is more likely that the user is searching for his friend instead of some stranger. Furthermore, the other two Johnsons may not even be selected as search results for the user. In another case, suppose that two Johnsons (e.g., Johnson #1 and Johnson #2) are both friends of the user, but Johnson #1 is directly connected to the user (e.g., in the graph, there is an edge between the two nodes representing the user and Johnson #1 respectively) while Johnson #2 is indirectly connected to the user (e.g., connected through one or more other nodes based on the graph), or the user has contacted Johnson #1 more times or more frequently than Johnson #2. In this case, both Johnson #1 and Johnson #2 may be included in the set of search results, but Johnson #1 may be ranked higher than Johnson #2.

As another example, suppose that there are two businesses having the word "Johnson" in their names: Johnson's Hardware Store and Johnson BBQ Restaurant. The electronic device the user uses to conduct the search may supply location data (e.g., GPS data) that indicate the location of the device, and thus the location of the user, where the user requests the search on "Johnson". In one case, suppose that Johnson BBQ Restaurant is near the location of the user, while Johnson's Hardware Store is farther away. In this case, Johnson BBQ Restaurant may be ranked higher than Johnson's Hardware Store as it is more likely that the user is searching for a nearby business. In another case, suppose that the user has visited Johnson BBQ Restaurant in the past but has never been to Johnson's Hardware Store. In this case, Johnson BBQ Restaurant may also be ranked higher than Johnson's Hardware Store as it is more likely that the user is searching for a business with which he has some contact in the past.

As a third example, suppose that there are two events having the word "Johnson" in their descriptions: Johnson's birthday party and Johnson City council meeting. If the user has been invited to Johnson's birthday party and has responded affirmatively to the invitation, then Johnson's birthday party may be ranked higher than Johnson City council meeting. If the user does not live in Johnson City, then Johnson City council meeting may not be included in the search results at all, as Johnson City council meeting probably has no relation to the user. If Johnson's birthday party is scheduled for Saturday evening at 6:00 pm and the time the user requests the search is approximately Saturday at 5:00 pm, then again, Johnson's birthday party may be ranked higher, as it is more likely that, as the time when the user conducts the search is fairly close to the time of the event, the user is checking for information about the event in preparation of attendance.

As a fourth example, suppose that based on the user's profile, the user is interested in auto racing, or the user has posted messages about auto racing. In one case, a news story (e.g., a news feed) about Jimmie Johnson participating in a NASCAR race may be ranked higher as it is more likely that the user may be interested in such a story. In another case, suppose that there are multiple news feeds about Jimmie Johnson and auto racing, but some are older and some are newer. The more recent news feeds that are closer to the time when the user conducts the search may be ranked higher than the older news feeds as they are more likely to be of interest to the user than the older, and thus perhaps obsolete, news feeds.

As the above examples illustrate, when selecting and ranking a set of search results in response to a search query submitted by a user, any available information relevant to the user, to the search, or to the search query may be used. Such information may be stored at various sites, such as on the user's device, in association with the social-networking system, or publicly on the Internet. If some information is already available on the user's device, then it may not be necessary to obtain that information again from the social-networking system or on the Internet. In particular embodiments, the information contained in the social-networking system may be represented as a graph (e.g., as illustrated in FIG. 1), and such a graph may be used to compute, for each node in the graph, a coefficient that indicates its relationship to the node corresponding to the user requesting the search. This coefficient may be used to help rank the set of search results. In particular embodiments, each search result may correspond to a node in the graph as well.

In particular embodiments, a specific search result may be presented to the user as soon as it becomes available. As more search results become available, they may be added to and co-mingled with the existing search results and presented to the user as well. At the same time, the search results may be ranked and the higher-ranked search results should be presented to the user before the lower-ranked search results. However, a first search result that becomes available before a second search result is not necessarily ranked higher than the second search result. In particular embodiments, when ranking the search results, a ranking score may be computed for each search result, and the search results are ranked based on their respective ranking scores. In particular embodiments, as each search result becomes available, its ranking score may be computed. Between two search results, suppose that the first search result becomes available before the second search result; however, the ranking score of the first search result is lower than the ranking score of the second result, which means that based on their respective ranking scores, the second search result should be presented above the first search result on the display screen of the user's electronic device. By the time the second search result becomes available, the first search result may have already been presented to the user (i.e., displayed on the display screen of the user's electronic device). In particular embodiments, since the second search result is ranked higher than the first search result, when presenting the second search result to the user, the second search result is placed (e.g., inserted) above the first search result on the display screen of the user's electronic device, effectively "pushing" the first search result further down the display screen.

Particular embodiments may boost the respective ranks of one or more search results in the set so that they may be presented to the user before some other search results that would normally rank higher than them, as illustrated in STEP 340. There are different reasons for boosting the rank of a specific search result.

For example, the social-networking system providing the search tool may wish to achieve certain business objectives. Suppose that the user requesting the search only has a very few friends (e.g., less than 5 friends) identified in his account at the social-networking website. The social-networking system may desire to encourage such a user to have more friends. Suppose that the user is attending an event at a specific location when he conducts a search based on the query "Johnson". In one case, suppose that there are two Johnsons also attending the same event. Johnson #1 is the user's friend, while Johnson #2 is a stranger to the user. Normally, Johnson #1 would be ranked higher than Johnson #2, as it is more likely that the user is searching for his friend who is attending the same event as he is. However, to encourage the user to meet new friends, the rank of Johnson #2 may be booted to be above the rank of Johnson #1, and so, Johnson #2 is presented to the user before Johnson #1. As a result, the user may meet and become friends with Johnson #2 as well. In another case, suppose that a person named "Smith", who is a friend to the user's friend Johnson but is a stranger to the user, is also attending the same event. Normally, Smith may not be included in the set of search results compiled for the query "Johnson", or if Smith is included in the search results compiled for the query "Johnson", it may be ranked relatively low. However, to encourage the user to meet new friends, the rank of Smith may be boosted to be above the ranks of some other search results, and so is presented to the user fairly soon. As a result, the user may meet and become friends with Smith, especially considering they share a common friend.

As a second example, the social-networking system may wish to train the user about certain functionalities of features, or encourage certain user behaviors. In one case, suppose that the user requesting the search does not yet know he can play various online games through the social-networking website. When the user requests a search for the query "café", an online game named "Café Mystery" may be included in the search results with a boosted rank. When this game is presented to the user, the user may learn that he can play this game and many other games. Such type of boosting may be repeated for a number of times, until the user is familiar with the functionalities or acquired certain behavior patterns. Thereafter, it would no longer be necessary to boost the ranks of similar types of search results.

As a third example, suppose that the social-networking system recently has added a new feature to its website. To bring this new application to its users' attention, when a user requests a search, a search result relating to the new feature (e.g., a link pointing to the new feature) may be included as one of the search results. This may be determined based on whether a specific user has previously used the new feature. In one case, if the user requesting the search has already used the new feature, then the new feature may not need to be included in the search results, especially if the new feature has little or no relevance to the search query, as the user already knows about the new feature. On the other hand, if the user requesting the search has never interacted with the new feature thus far, then the new feature may be selected as one of the search results. Furthermore, the ranking of the new feature may be boosted so that it is presented to the user fairly soon to capture the user's attention.

In particular embodiments, given a set of search results compiled for a search query provided by a user, a ranking score may be computed for each search result in the set. In particular embodiments, the ranking score may be computed using an algorithm that takes into consideration of many factors (e.g., various factors as inputs to the algorithm), such as, for example and without limitation, the level of content relevance of the search result to the search query, the level of social relevance of the search result to the user requesting the search or the search query, the amount of boosting given to the search result, if any (e.g., determined based on business objectives), the degree of closeness in terms of time or location the search result has to the time when or location where the user requests the search, and so on. The algorithm may combine all available factors (i.e., inputs) to determine a final ranking score for each search result. In particular embodiments, the ranking score may be normalized to a number between 0 and 1.

In some cases, there may be one or more search results associated with a feature of the social-networking website included in the set. Given a specific feature, in particular embodiments, if the user has not interacted with the feature, then one or more search results associated with the feature may be included in the set. Furthermore, the ranking of these search results may be boosted (e.g., by providing a boosting factor to the ranking algorithm that increases the respective ranking scores of these search results) so that these search results are presented to the user sooner, in the hopes that the user may become aware of and subsequently use the feature. On the other hand, if the user has already interacted with the feature, then no special action in connection with the feature (e.g., selecting search results associated with the feature and boosting their ranking) may be needed.

Alternatively, in particular embodiments, given a specific feature, the amount or frequency of interaction the user has with the feature may be determined. For example, the level of interaction the user has with the feature may be represented as a number between 0 and 1. If the user has no interaction with the feature, the level of interaction may be 0. On the other hand, if the user uses the feature often, the level of interaction may be close to 1. When a user requests a search to be conducted on a given search query, whether to include one or more search results relating to the feature in the set of search results compiled for the search query and if so, how much to boost the ranking of these search results may depend on the current level of interaction the user has with the feature. For example, if the user has no or very low level of interaction with the feature, several search results relating to the feature may be included in the set and their rankings may be boosted much higher. As the user interacts with the feature more and more, and number of search results relating to the feature included in the set may gradually decrease and their rankings may only need to be boosted slightly. Finally, as the user interacts with the feature frequently, no search result relating to the feature needs to be included in the set.

In particular embodiments, a boosting coefficient (e.g., a number between 0 and 1) may be determined for each search result relating to the feature based on the current level of interaction the user has with the feature. This boosting coefficient may be supplied to the ranking algorithm as one of the inputs when computing the ranking score for each search result. For a search result not related to the feature, its boosting coefficient may be set to 0 (i.e., no boosting). For example, when the user has no or little interaction with the feature, the boosting coefficient may be close to 1. As the user interacts with the feature more and more, the boosting coefficient may gradually decreases. Finally, as the user interacts with the feature frequently, the boosting coefficient may be close to 0.

In particular embodiments, when including search results relating to a feature in a set of search results compiled for a search query, the user may be given an option to indicate that he is not interested in that feature. If the user has indicated that he is not interested in a specific feature, then for subsequent searches requested by this user, search results relating to the specific feature are not artificially selected as search results, especially when such search results have little or no relevance otherwise to the search queries provided by the user. Thus, once the user has indicated that he is not interested in a specific feature, even if the user has never interacted with the feature, search results relating to the feature are not artificially selected as search results, and when search results relating to the feature are selected as search results, their respective ranks are not artificially boosted.

In some cases, the user's past behavior, when available, may be used to help select and/or rank the search results, as well as determine which search results should have their ranks boosted. In particular embodiments, the user's behavior may be collected into a behavior profile, and the information contained in this profile may be used by the search tool as needed. For example, suppose that a user rarely or never selects (e.g., taps) on search results that are places. This may suggest that the user is not interested in place-type search results. In this case, to take into consideration the user's personal preference, when selecting search results for the user, the search tool may include very few or no place-type search results. Conversely, the system may wish to encourage the user to explore different types of search results in order to expand the user's interests. As a result, when selecting search results for the user, the search tool may include a larger number of place-type search results. Furthermore, the ranks of at least some of the place-type search results may be artificially boosted to bring them to the user's attention. Similar strategies may be applied with respect to a specific search result (e.g., the user never selects a specific search result).

As another example, suppose that the user only selects specific types of search results while at home, at work, or traveling. Thus, based on the user's current location, a larger number of those specific types of search results may be included, and if appropriate, the ranks of at least some of those types of search results may be boosted.

As a third example, the user may like to view (e.g., read) web pages associated with another specific person (e.g., that person's personal page or pages authored by that person, such as blogs), but due to various reasons, the user may not communicate directly to that person (e.g., reply or comment on the pages the user has read). The social-networking system associated with the search tool may have a business object to encourage its users not only to passively view information (e.g., content of web pages) but actively contribute information as well (e.g., by writing comments, replies, etc.). When the user views a web page, it is more likely that the user may be willing to further interact with that page or with the author of the page, since the user has already shown interest in the content of the page. In this case, for example, the ranking of the web page may be boosted.

Particular embodiments may present the search results, according to their respective ranks, to the user by display them on the user's device in the order of their ranks, as illustrated in STEP 350.

Sophisticated user devices may have a sufficient amount of storage space for storing various types data. For example, with a smart telephone, some of the user's contacts, calendar appointments, events, task lists, instant messages, emails, news feeds, etc. may be stored on the device. Such information is available even when the device is offline (i.e., disconnected from a network). In particular embodiments, the user may conduct searches with his device regardless of whether the device is online (i.e., connected to a network) or offline. If the device is online when the user requests a search, the search results may be compiled based on information both stored on the user's device as well as information available with the social-networking system and on the Internet. If the device is offline when the user requests a search, the search results may be compiled based only on the information stored on the user's device.

In particular embodiments, the search results are presented to the user (e.g., displayed on the screen of the user's electronic device) as soon as they become available. In addition, the search results may be ranked, and higher-ranked search results may be displayed on the screen of the user's electronic device above the lower-ranked search results. When a higher-ranked search result becomes available after a lower-ranked search result, it may be displayed on the screen of the user's electronic device above the lower-ranked search result, which has already been displayed, by pushing the lower-ranked search result further down on the screen of the user's electronic device.

In some cases, a user may start a search process (e.g., by submitting a search query) while the user's device is offline. However, while the search is being conducted, the device may be connected to a network and come online. In this case, before the device comes online, the search results may be obtained based on information stored locally on the device. After the device comes online, additional search results may be obtained from information available with the social-networking system and on the Internet. The new search results, after they become available, may co-mingle with the existing search results. The rank of each search result may be determined. The presentation of the search results may be adjusted when necessary to incorporate the newly available search results (e.g., inserting some newly available search results above some existing search results on the screen of the user's device).

The search tool functionalities (e.g., identifying, ranking, and boosting search results) described above may be implemented as a series of instructions stored on a computer-readable storage medium that, when executed, cause a programmable processor to implement the operations described above. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems of a social-networking system:
    receiving, from a client device of a first user of the social-networking system, a search query comprising one or more characters inputted by the first user, the one or more characters being received as the first user inputs the one or more characters at the client device into a user interface of the social-networking system;
    identifying one or more entities associated with the social-networking system matching the one or more characters of the search query;
    ranking each of the identified entities matching the search query based on a calculated likelihood that the user will interact with a search result corresponding to the identified entity, wherein the calculated likelihood that the user will interact with the search result corresponding to the identified entity is based at least in part on a historical behavior of the user in selecting one or more prior search results related to the identified entity;
    boosting one or more ranks of one or more of the identified entities matching the search query based on:
        one or more business objectives of the social-networking system, wherein at least one of the business objectives comprises encouraging the first user to interact with the identified entity based on a level of social relevance of the identified entity with respect to the first user; and
        a level of the user's interaction with one or more features of the social-networking system associated with the identified entity, wherein the boosting is designed to increase the level of the user's interaction with the one or more features of the social-networking system associated with the identified entity; and
    sending, to the client device of the first user and in response to the received search query, one or more search results for presentation to the user as the user inputs the one or more characters at the client device into the user interface, each search result corresponding to one of the identified entities, the search results being presented according to the ranking and boosting of the corresponding identified entities, the presentation of the search results to the user enabling the user to select one or more of the search results to interact with.

2. The method of claim 1, wherein the search query is a user-generated character string comprising the one or more characters inputted by the user, the user-generated character string being received from the client device of the first user, and wherein the user-generated character string is entered by the first user in a query field and rendered at the client device as each character of the character string is entered by the user.

3. The method of claim 1, further comprising auto-populating, at the client system, a query field with the search results.

4. The method of claim 1, wherein the search query is received from a client-side process executing within the client device or from a client-side document rendering application in response to one or more instructions from the client-side process.

5. The method of claim 1, wherein the search results are provided as real-time suggestions responsive to the one or more characters thus far inputted by the first user.

6. The method of claim 1, wherein one or more of the business objectives is associated with one or more of the features.

7. The method of claim 1, wherein one or more of the business objectives comprises encouraging users to use one or more of the features.

8. The method of claim 7, wherein the lower level of interaction the user has with the one or more features, the higher the one or more ranks of one or more of the identified entities associated with the one or more features are boosted.

9. The method of claim 1, wherein at least one of the features is the user's ability to form a friend connection with other users of the social-networking system.

10. The method of claim 9, wherein the one or more features further comprise an ability to:
    form a social group;
    organize an event;
    upload a photo;
    read a digest comprising at least one social-media update;
    interact with a new function recently implemented by the social-networking system; or
    play an online game supported by the social-networking system.

11. The method of claim 1, wherein ranking of each of the identified entities is further based on a location of the user.

12. The method of claim 1, wherein boosting one or more ranks of one or more of the identified entities comprises boosting the ranking of the one or more of the identified entities to bring one or more features associated with the identified entities to the user's attention.

13. The method of claim 1, wherein ranking each of the identified entities is further based on a level of content relevance of the identified entity to the search query.

14. The method of claim 1, wherein ranking each of the identified entities is further based on a level of social relevance of the identified entity to the search query.

15. The method of claim 1, wherein boosting one or more ranks of one or more of the identified entities is further based on a boosting coefficient determined for the identified entity based on the user's level of interaction with one or more features associated with the identified entity.

16. The method of claim 1, wherein:
    the social-networking system is associated with a social graph;
    the social graph comprises one or more nodes and one or more edges, each node representing an entity, each edge connecting two nodes and representing a relationship between the two entities respectively represented by the two nodes; and
    ranking each of the identified entities is further based on, for each identified entity, a distance between a first node representing the identified entity and a second node representing the first user within the social graph.

17. A system comprising:
    a memory; and
    one or more processors coupled to the memory and configured to perform operations comprising:
    receive, from a client device of a first user of a social-networking system, a search query comprising one or more characters inputted by the first user, the one or more characters being received as the first user inputs the one or more characters at the client device into a user interface of the social-networking system;
    identify one or more entities associated with the social-networking system matching the one or more characters of the search query;
    rank each of the identified entities matching the search query based on a calculated likelihood that the user will interact with a search result corresponding to the identified entity, wherein the calculated likelihood that the user will interact with the search result corresponding to the identified entity is based at least in part on a historical behavior of the user in selecting one or more prior search results related to the identified entity;
    boost one or more ranks of one or more of the identified entities matching the search query based on:
        one or more business objectives of the social-networking system, wherein at least one of the business objectives comprises encouraging the first user to interact with the identified entity based on a level of social relevance of the identified entity with respect to the first user; and
        a level of the user's interaction with one or more features of the social-networking system associated with the identified entity, wherein the boosting is designed to increase the level of the user's interaction with the one or more features of the social-networking system associated with the identified entity; and
    send, to the client device of the first user and in response to the received search query, one or more search results for presentation to the user as the user inputs the one or more characters at the client device into the user interface, each search result corresponding to one of the identified entities, the search results being presented according to the ranking and boosting of the corresponding identified entities, the presentation of the search results to the user enabling the user to select one or more of the search results to interact with.

18. One or more computer-readable non-transitory storage media embodying software operable when executed by one or more computer systems to:
    receive, from a client device of a first user of a social-networking system, a search query comprising one or more characters inputted by the first user, the one or more characters being received as the first user inputs the one or more characters at the client device into a user interface of the social-networking system;
    identify one or more entities associated with the social-networking system matching the one or more characters of the search query;
    rank each of the identified entities matching the search query based on a calculated likelihood that the user will interact with a search result corresponding to the identified entity, wherein the calculated likelihood that the user will interact with the search result corresponding to the identified entity is based at least in part on a historical behavior of the user in selecting one or more prior search results related to the identified entity;
    boost one or more ranks of one or more of the identified entities matching the search query based on:

one or more business objectives of the social-networking system, wherein at least one of the business objectives comprises encouraging the first user to interact with the identified entity based on a level of social relevance of the identified entity with respect to the first user; and a level of the user's interaction with one or more features of the social-networking system associated with the identified entity, wherein the boosting is designed to increase the level of the user's interaction with the one or more features of the social-networking system associated with the identified entity; and send, to the client device of the first user and in response to the received search query, one or more search results for presentation to the user as the user inputs the one or more characters at the client device into the user interface, each search result corresponding to one of the identified entities, the search results being presented according to the ranking and boosting of the corresponding identified entities, the presentation of the search results to the user enabling the user to select one or more of the search results to interact with.

* * * * *